(12) United States Patent
Favorito et al.

(10) Patent No.: US 11,951,410 B2
(45) Date of Patent: Apr. 9, 2024

(54) RIDE-ON TOY VEHICLE

(71) Applicant: Mattel, Inc., El Segundo, CA (US)

(72) Inventors: Anthony Robert Favorito, Buffalo, NY (US); Morgan Siebold, Cheektowaga, NY (US); Jon Paul Castiglione, Orchard Park, NY (US); Carl J. Kamph, Hamburg, NY (US); Patrick Schaefer, Buffalo, NY (US)

(73) Assignee: Mattel, Inc., El Segundo, CA (US)

( * ) Notice: Subject to any disclaimer, the term of this patent is extended or adjusted under 35 U.S.C. 154(b) by 373 days.

(21) Appl. No.: 17/342,915

(22) Filed: Jun. 9, 2021

(65) Prior Publication Data

US 2022/0395760 A1 Dec. 15, 2022

(51) Int. Cl.
| | | |
|---|---|---|
| *A63H 17/26* | (2006.01) | |
| *A63H 17/38* | (2006.01) | |
| *A63H 18/02* | (2006.01) | |
| *A63H 29/22* | (2006.01) | |

(52) U.S. Cl.
CPC ........... *A63H 17/262* (2013.01); *A63H 17/38* (2013.01); *A63H 18/026* (2013.01); *A63H 18/028* (2013.01); *A63H 29/22* (2013.01)

(58) Field of Classification Search
CPC .... A63H 17/262; A63H 17/38; A63H 18/026; A63H 18/028; A63H 29/22; A63H 17/008; A63H 33/003; A63H 19/00; B62J 50/40; B62K 2204/00; B62K 9/00; A47D 15/00

See application file for complete search history.

(56) References Cited

U.S. PATENT DOCUMENTS

| | | | |
|---|---|---|---|
| 4,562,893 A * | 1/1986 | Cunard | B60L 50/52 180/22 |
| 4,614,504 A | 9/1986 | Yamasaki | |
| 4,708,683 A * | 11/1987 | Lehmann | A63H 17/05 446/434 |
| 6,520,829 B1 * | 2/2003 | Temple | A63H 17/05 446/434 |
| 7,905,305 B2 * | 3/2011 | Lucas | B62K 9/00 180/908 |
| 8,668,081 B2 | 3/2014 | Hippely | |
| 9,150,102 B1 * | 10/2015 | Gastle | B23P 19/04 |
| 2006/0231303 A1 * | 10/2006 | Fobean | B62K 9/00 180/65.1 |

(Continued)

FOREIGN PATENT DOCUMENTS

| | | | | |
|---|---|---|---|---|
| CN | 109621453 A | * | 4/2019 | ........... A63H 33/003 |
| KR | 102176940 B1 | * | 11/2020 | |

(Continued)

*Primary Examiner* — James A Shriver, II
*Assistant Examiner* — Ian Bryce Shelton
(74) *Attorney, Agent, or Firm* — Edell, Shapiro & Finnan, LLC

(57) ABSTRACT

A ride-on vehicle for children comprising a main body that includes one or more built-in toy vehicle tracks that allow a toy vehicle to travel on the main body. A wheel assembly comprising a plurality of wheels is coupled to the main body. A drive assembly is operatively coupled to the wheel assembly and is configured to drive two or more wheels of the wheel assembly. A steering assembly is also operatively coupled to the wheel assembly and is configured to steer the vehicle based on a received user input.

20 Claims, 4 Drawing Sheets

(56) References Cited

U.S. PATENT DOCUMENTS

| | | | | | |
|---|---|---|---|---|---|
| 2007/0045013 | A1* | 3/2007 | Bergum | | H01M 10/48 180/65.1 |
| 2007/0290497 | A1* | 12/2007 | Arendt | | B62K 9/00 280/828 |
| 2010/0216372 | A1* | 8/2010 | Sitarski | | B62K 9/00 446/470 |
| 2012/0118765 | A1* | 5/2012 | Hippely | | A63H 33/003 206/216 |
| 2012/0171922 | A1* | 7/2012 | Schlegel | | A63H 18/02 446/168 |
| 2013/0231028 | A1* | 9/2013 | Ostendorff | | A63H 18/026 446/444 |
| 2014/0051325 | A1* | 2/2014 | Paukert | | A63H 33/003 446/376 |
| 2014/0097262 | A1* | 4/2014 | Ostendorff | | A63H 18/025 238/10 A |
| 2014/0256219 | A1* | 9/2014 | Lennon | | A63H 17/008 446/429 |
| 2014/0265195 | A1* | 9/2014 | Howell | | B62K 9/00 280/79.2 |
| 2014/0273719 | A1* | 9/2014 | Weisman | | A47D 15/003 446/227 |
| 2015/0135981 | A1* | 5/2015 | Gastle | | B61B 13/00 104/53 |
| 2018/0099230 | A1* | 4/2018 | Young | | B60L 15/2009 |
| 2018/0229796 | A1* | 8/2018 | Chojecki | | B62K 5/05 |
| 2018/0250603 | A1* | 9/2018 | Colangelo | | A63H 17/008 |
| 2018/0317668 | A1* | 11/2018 | Cotirla | | A47D 11/002 |
| 2019/0099683 | A1* | 4/2019 | Wong | | A63H 17/28 |
| 2019/0336878 | A1* | 11/2019 | Talios | | A63H 29/24 |
| 2020/0010007 | A1* | 1/2020 | Sanders | | A63H 30/00 |
| 2020/0078696 | A1* | 3/2020 | Womack | | A63H 17/05 |

FOREIGN PATENT DOCUMENTS

| | | | | |
|---|---|---|---|---|
| WO | WO-2007127119 A2 | * | 11/2007 | ............ B60K 1/00 |
| WO | WO-2009148991 A1 | * | 12/2009 | ............ B62K 9/00 |

\* cited by examiner

RIDE-ON TOY VEHICLE

FIELD OF THE INVENTION

The present invention relates generally to ride-on vehicles for children, and in particular, a ride-on vehicle that includes a built-in track system for toy vehicles.

BACKGROUND OF THE INVENTION

Children's ride-on vehicles are reduced-scale vehicles designed to be driven by children at relatively low and safe speeds. The ride-on vehicles typically have a battery-powered motor and include simple steering and acceleration/braking controls that allow a child to easily operate the vehicle. The ride-on vehicles are often designed to resemble real-world cars and vehicles, though many others are designed as fantasy vehicles that do not have real-world counterparts. Because the ride-on vehicles are designed for use by children, the ride-on vehicles often include colorful graphics and decorations, as well as features such as working radios and opening/closing doors. But while there are many ride-on vehicles with different designs and features in the art, there is still a need for ride-on vehicles with fun and novel features that will appeal to children and provide additional play value.

SUMMARY OF THE INVENTION

A children's ride-on vehicle is described herein that includes an interactive toy vehicle track system which allows toy vehicles, such as 1:64 scale diecast cars, to be raced on the ride-on vehicle. The ride-on vehicle itself may also be driven around by a child and further contains drive and steering assemblies. The drive assembly includes a battery-powered motor that drives one or more wheels of the ride-on vehicle. As part of the drive assembly, a foot pedal enables the child to select when power is delivered to the motor and a shifter enables the child to select a forward or reverse direction and the speed at which the ride-on vehicle travels. The steering assembly includes a steering wheel that allows the child to steer the ride-on vehicle.

In one or more embodiments, the ride-on vehicle comprises a main body that defines a riding space that is sized to accommodate at least one child. The main body includes one or more toy vehicle tracks and has an enclosed storage space for receiving toy vehicles traveling along the one or more toy vehicle tracks. Coupled to the main body is a wheel assembly that comprises a plurality of wheels. A drive assembly is operatively coupled to the wheel assembly and is configured to drive two or more wheels of the wheel assembly. A steering assembly is also operatively coupled to the wheel assembly and is configured to steer the vehicle based on a received user input.

The main body includes a built-in toy vehicle launcher connected to the toy vehicle track. The toy vehicle launcher is connected to a first end of the toy vehicle track and the toy vehicle track is configured such that a toy vehicle launched by the toy vehicle launcher travels along the toy vehicle track and enters the enclosed storage space via a second end of the toy vehicle track. In certain embodiments, the main body includes two toy vehicle tracks that both direct toy vehicles traveling on the toy vehicle tracks into the enclosed storage space. In one embodiment, the enclosed storage space is positioned proximate to a front end of the main body and the toy vehicle launcher is positioned proximate to a back end of the main body. A pivotable front hood provides access to the enclosed storage space. The toy vehicle track further includes a loop track. In one instance, at least a portion of the loop track is removable from the main body. Preferably, the main body is molded to receive at least a portion of the toy vehicle track.

In one or more other embodiments, the ride-on vehicle for children comprises a main body that defines a riding space sized to accommodate at least one child. Coupled to the main body is a wheel assembly that comprises a plurality of wheels. A battery-powered drive assembly is operatively coupled to the wheel assembly and is configured to drive two or more wheels of the wheel assembly. A steering assembly is also operatively coupled to the wheel assembly and is configured to steer the vehicle. Additionally, the ride-on vehicle includes two toy vehicle tracks, two toy vehicle launchers, and an enclosed storage space. The toy vehicle tracks each have a first end and a second end and are configured to allow toy vehicles to travel on the ride-on vehicle. The toy vehicle launchers are connected to the first ends of the toy vehicle tracks. The enclosed storage space is connected to the second ends of both toy vehicle tracks and has a pivotable cover that provides access to the enclosed storage space.

The main body has a front end, a back end, a first side, and a second side. In one embodiment, the enclosed storage space is positioned proximate to the front end and the toy vehicle launchers are positioned proximate to the back end. A portion of one of the toy vehicle tracks is positioned on the first side and a portion of the other toy vehicle track is positioned on the second side. Additionally, the ride-on vehicle includes a steering wheel for controlling the steering assembly and a speed controller for controlling the drive assembly. The steering wheel and speed controller are both positioned for actuation by a child sitting in the riding space.

Other objects, features and advantages of the present invention will become apparent to those skilled in the art from the following detailed description. It is to be understood, however, that the detailed description and specific examples, while indicating some embodiments of the invention, are given by way of illustration and not limitation. Many changes and modifications within the scope of the invention may be made without departing from the spirit thereof, and the present invention includes all such modifications.

BRIEF DESCRIPTION OF THE DRAWINGS

Referring now to the drawings in which like reference numbers represent corresponding parts throughout.

DETAILED DESCRIPTION OF THE INVENTION

Figure 1:
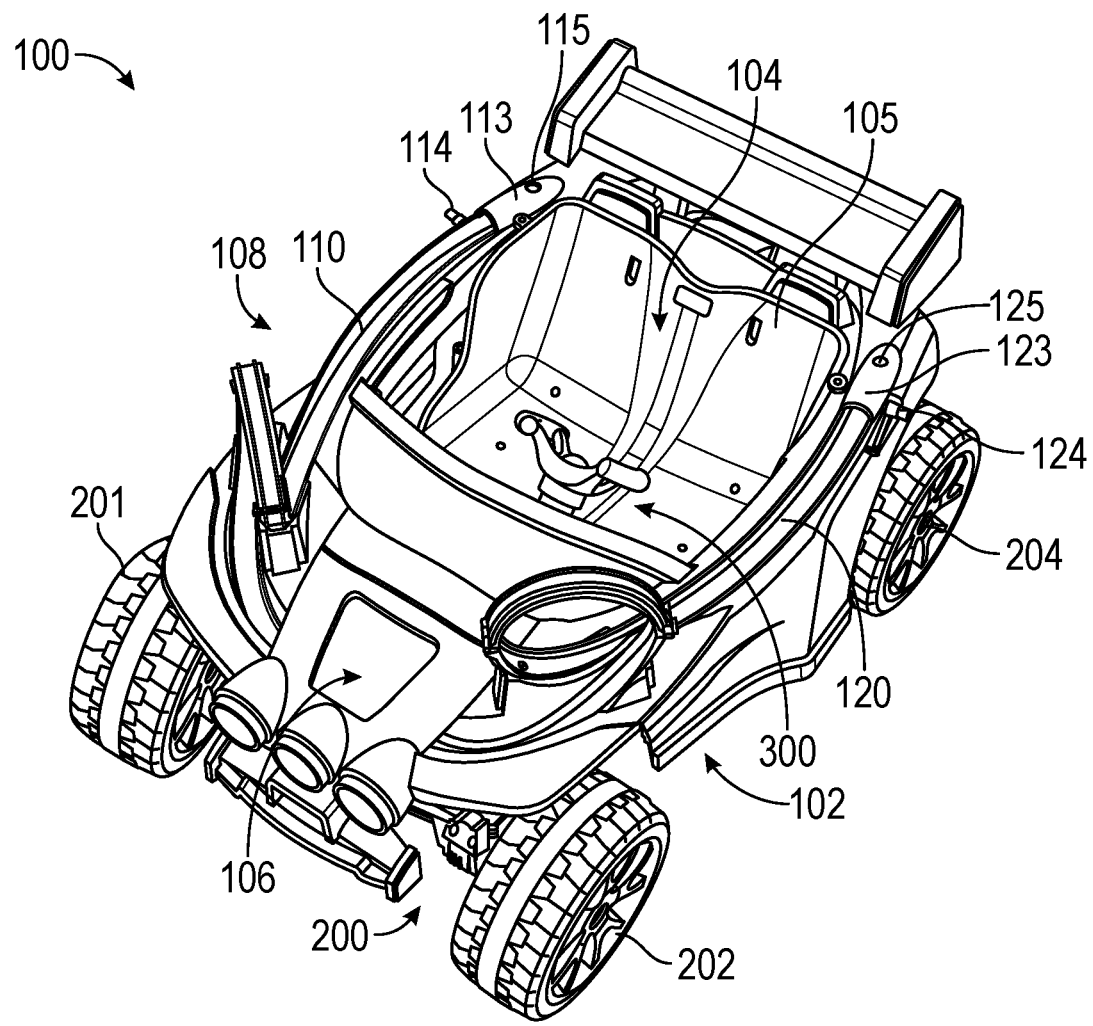
FIG. 1 illustrates a front perspective view of a ride-on vehicle, in accordance with an embodiment of the invention.
Figure 2:
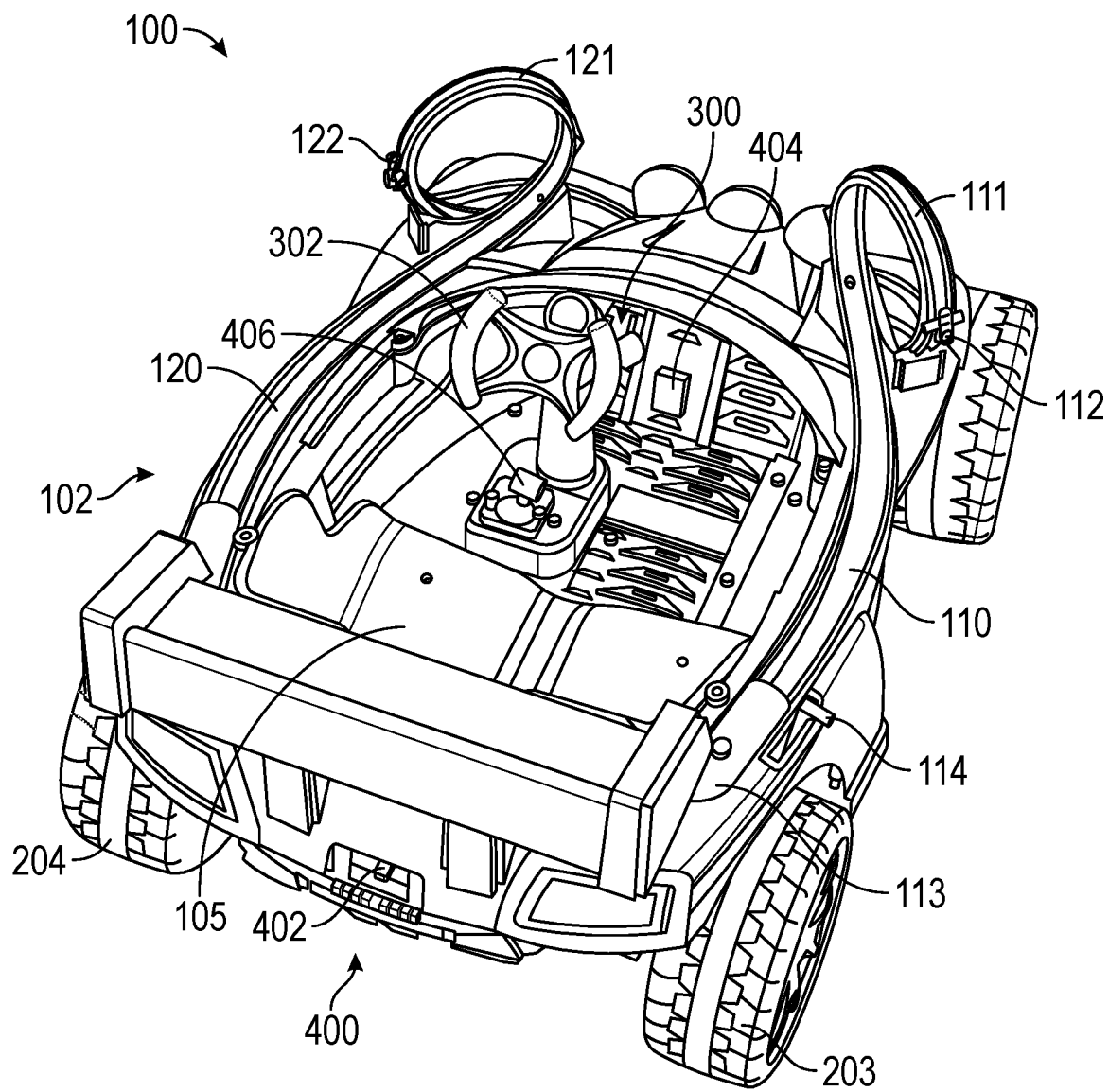
FIG. 2 illustrates a back perspective view of the ride-on vehicle of FIG. 1, in accordance with an embodiment of the invention.

A children's ride-on vehicle with an interactive, built-in toy vehicle track system is disclosed. FIGS. 1-6 set forth an illustrative example of the ride-on vehicle. As shown in FIGS. 1 and 2, ride-on vehicle 100 has a main body 102 made from molded plastic that may be integrally formed or formed from a plurality of parts that are secured together by screws, clips or other suitable fasteners. Alternatively, the main body may be made of some other suitable material including metal, wood, or a composite structure having suitable strength to accommodate and support the weight of at least one child. The main body may further include an underlying frame on which a chassis is mounted. In such an embodiment, the frame is often formed of metal and/or molded plastic, with the chassis formed of molded plastic.

Main body 102 includes a riding space 104 that is sized to accommodate at least one child. Within riding space 104 is a seat assembly 105 that is configured to receive both a driver and a passenger. The seat assembly may have any suitable configuration, including configurations in which the position of the seat assembly is adjustable within the riding space, and configurations in which the seat assembly includes two or more individual seats or seating regions. Furthermore, the seat assembly may be integral with or otherwise mounted on the main body and/or a chassis of the ride-on vehicle. Alternatively, in other embodiments, the riding space 104 may be sized to accommodate one child or more than two children.

Figure 3:
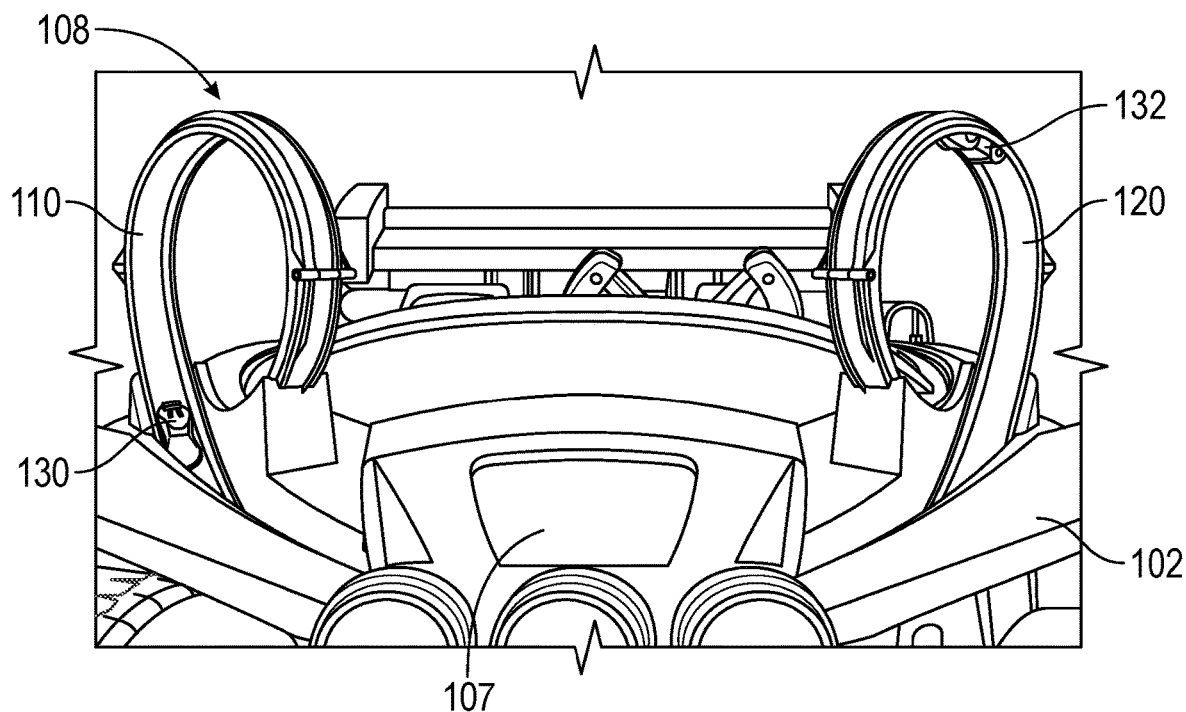
FIG. 3 illustrates a close-up front view of the ride-on vehicle of FIG. 1, in accordance with an embodiment of the invention.
Figure 4:
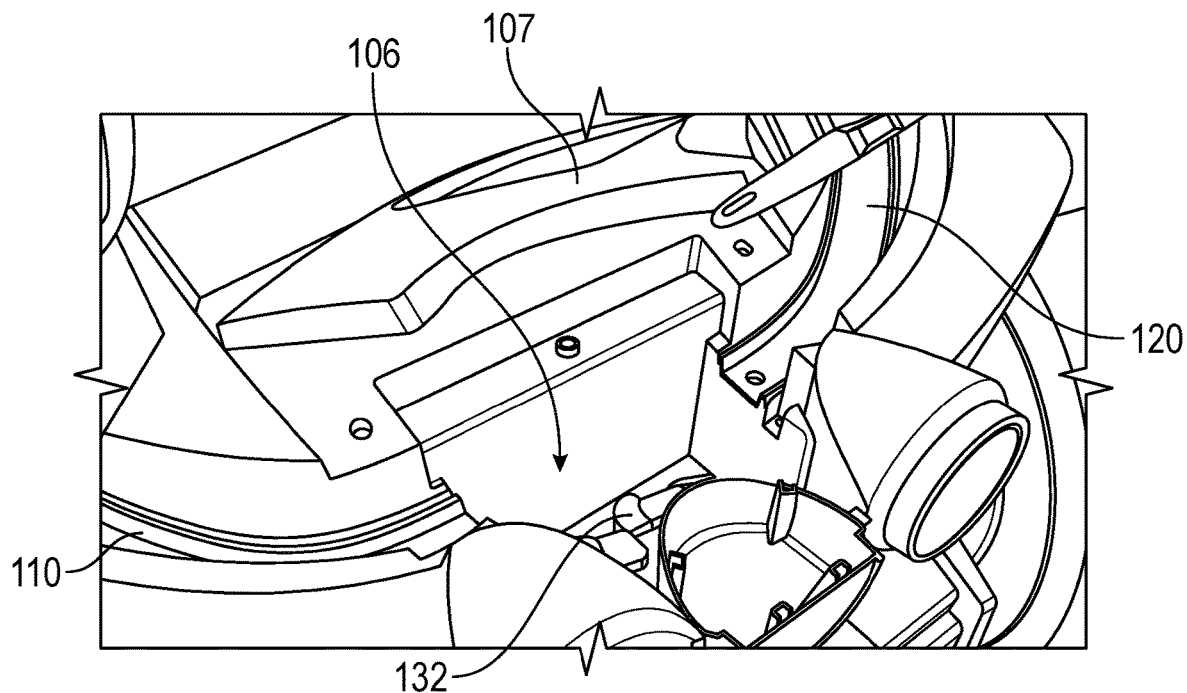
FIG. 4 illustrates a close-up perspective view of the ride-on vehicle of FIG. 1 with the front hood opened to show a storage space, in accordance with an embodiment of the invention.
Figure 5:
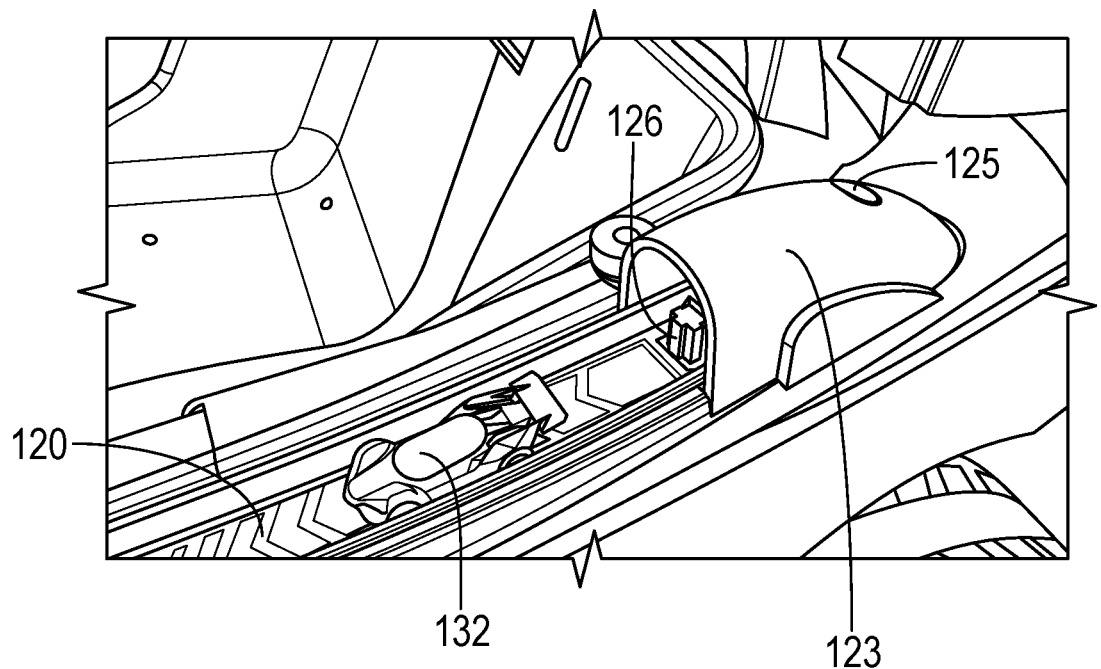
FIG. 5 illustrates a close-up view of a toy vehicle launcher for the ride-on vehicle of FIG. 1, in accordance with an embodiment of the invention.

The front portion of main body 102 includes a storage compartment or enclosed storage space 106. As shown in FIGS. 3 and 4, storage space 106 is sized to store multiple toy vehicles and/or toy vehicle track pieces. Storage space 106 is further positioned to receive toy vehicles traveling along a built-in toy vehicle track system 108 on ride-on vehicle 100. The interior of storage space 106 may be accessed by lifting a front hood 107, which is secured in the closed positioned via a friction fit. In other instances, the front hood 107 may be secured with a latch mechanism and/or locked with a key. Alternatively, the enclosed storage space 106 may be positioned in other areas of the ride-on vehicle, for example a back area, a side area, or a dashboard/glove compartment area in front of the seat assembly. Furthermore, the ride-on vehicle may have one or more enclosed storage spaces 106.

Ride-on vehicle 100 includes a toy vehicle track system 108 comprised of two separate toy vehicle tracks 110, 120. Toy vehicle tracks 110, 120 may be any suitable rigid or semi-rigid structure configured to allow toy vehicles, for instance 1:64 diecast toy vehicles 130, 132, to travel along the tracks. In different embodiments, the toy vehicle track system may include any number of separate toy vehicle tracks, for instance one, two, three or more separate tracks. In the illustrative embodiment shown in FIGS. 1-6, each toy vehicle track 110, 120 has a single lane for toy vehicles to race along. Alternatively, each toy vehicle track may have a plurality of parallel lanes for toy vehicles to simultaneously race against each other on the same track.

Preferably, the toy vehicle tracks are attached, embedded, or otherwise integrated into the main body of the ride-on vehicle with various portions of the toy vehicle tracks positioned on top of, within, or underneath the main body. The main body may be further molded to receive or form at least a portion of the toy vehicle tracks. For instance, portions of toy vehicle tracks 110, 120 are positioned along the top of main body 102, where the two sides of main body 102 are molded to receive the toy vehicle tracks. Other portions of toy vehicle tracks 110, 120 extend into main body 102 and underneath front hood 107 (see, e.g., FIG. 4). Alternatively, in some embodiments, the main body 102 may define vehicle tracks 110 and 120.

Toy vehicle track system 108 may have a simple layout comprised of straight tracks or have a more complex layout that includes track segments of different shapes or geometries, such as curves, loops, and ramps. For example, toy vehicle tracks 110, 120 include respective loop tracks 111, 121 (see FIG. 2). Sections of loop tracks 111, 121 are further separable from toy vehicle tracks 110, 120 by unlatching respective couplers 112, 122. This allows the uncoupled loop track sections to be stored in storage space 106 when the toy vehicle tracks are not in use, such as when a child only wants to drive the ride-on vehicle or when the ride-on vehicle is in storage. Moreover, this allows loop tracks 111, 121 to be swapped out for other stunt tracks/accessories, such as turns, jumps, etc. (which could also be stored in storage space 106 when not in use).

In some embodiments, the toy vehicle tracks are formed through the coupling of multiple track segments. Each track segment includes a coupling portion or track connector at one or both ends. The track connector may be any structure suitable for facilitating selective end-to-end coupling of a track segment to another track segment or a component of the toy vehicle track system (e.g., vehicle launcher). For instance, the track connector may be configured as tongue-and-groove friction-fit connectors or snap-together nesting tabs. In some instances, the individual track segments are separable from each other to enable reconfiguration of the toy vehicle track. In other embodiments, the toy vehicle track is formed as a single track or a series of track segments that are generally inseparably coupled together.

Connected to one end of toy vehicle tracks 110, 120 are vehicle launchers 113, 123. Each vehicle launcher 113, 123 includes a respective handle 114, 124 and release trigger 115, 125 and is configured to propel a toy vehicle onto the toy vehicle track. The handle 114, 124 and release trigger 115, 125 are operatively coupled to a spring-biased launching rod (see, e.g., FIG. 5 which shows the launching rod 126 of vehicle launcher 123). When a child pulls the handle 114, 124 of the vehicle launcher 113, 123, potential energy is stored in the spring-biased launching rod 126 as it slides backwards into the vehicle launcher 113, 123 and is locked in a loaded position. A toy vehicle (such as toy vehicle 132 in FIG. 5) may then be placed inside the launcher 113, 123 such that one end of the toy vehicle 132 is proximate to or contacts the launching rod 126.

Then, pressing the release trigger 115, 125 causes the launching rod 126 to be released from the loaded position, thereby converting the stored potential energy into kinetic energy that moves the launching rod 126 forward and in turn propels the toy vehicle 132 positioned in front of the vehicle launcher 113, 123 forward and onto the toy vehicle track 110, 120. The vehicle launcher 113, 123 is configured to provide sufficient propulsion force that allows the toy vehicle 132 to travel along the full length of the toy vehicle track 110, 120 and enter enclosed storage space 106 at the other end of the toy vehicle track 110, 120. The vehicle launcher 113, 123 may then be reloaded with additional toy vehicles for repeated play. Alternative types of vehicle launchers may also be used, for example vehicle launchers with a manually-operated push-down lever and motorized vehicle launchers.

The two toy vehicle tracks 110, 120 both direct toy vehicles 130, 132 into enclosed storage space 106. Enclosed storage space 106 is positioned in the front of main body 102 and the toy vehicle launchers 113, 123 are positioned near the back of main body 102 to allow ample distance for the toy vehicles to travel on ride-on vehicle 100. In alternative embodiments, the enclosed storage space and toy vehicle tracks may be positioned in other layouts on the ride-on vehicle. For example, the toy vehicle tracks may separately direct toy vehicles to different enclosed storage spaces.

Now turning back to FIGS. 1 and 2, in addition to providing a built-in toy vehicle track system for a child to play with, ride-on vehicle 100 is also a reduced-scale vehicle that the child can steer and drive. Ride-on vehicle 100 can be driven forwards and backwards as well as steered left and right. Ride-on vehicle 100 has a wheel assembly 200 that includes a plurality of wheels 201, 202, 203, 204 rotatably coupled to main body 102. Front wheels 201 and 202 are adapted to be steered at least partially in response to user inputs to a steering assembly 300. Rear wheels 203 and 204 are adapted to be rotationally driven by a drive assembly 400. It should be understood that the term "driven" refers to rotating a wheel directly in response to a rotational input from the ride-on vehicle's drive assembly, which is either directly conveyed to the wheel by the output of a motor or conveyed through a linkage, such as a gearbox, belt, chain, gear assembly, axle, or the like.

In other embodiments, any combination of wheels may be driven and/or steerable. For example, it is within the scope of the invention that wheels 201-204 are all driven and steerable. Furthermore, a toy ride-on vehicle according to the present invention need not include four wheels and, instead, may vary from two wheels to four, six or more, although at least three wheels are typically included for stability. Moreover, the wheels of the toy ride-on vehicle may be replaced by, or used in conjunction with, other movement inducing mechanisms such as one or more treads or tracks (i.e., in a tank or snowmobile-like toy vehicle).

A portion of the ride-on vehicle's steering assembly 300, which includes a steering wheel 302, is shown in FIGS. 1 and 2. Steering assembly 300 enables a child sitting on seat assembly 105 to steer the ride-on vehicle's wheel assembly 200 via user-applied inputs to steering wheel 302. Other suitable steering mechanisms, such as handlebars and steering levers may also be used. Steering assembly 300 further includes any suitable mechanical linkages that convey the child's steering inputs from steering wheel 302 to the vehicle's wheel assembly 200.

Drive assembly 400 is adapted to drive the rotation of wheels 203, 204 of wheel assembly 200. Drive assembly 400 includes at least one motor that provides a rotational output to wheel assembly 200. Typically, the motor includes a rotating shaft and/or a rotation pinion or output gear. Additionally, drive assembly 400 includes a motor output linkage that mechanically interconnects the motor with wheel assembly 200. The motor output linkage may be any suitable mechanism that transmits the rotational output from the motor to the wheel assembly. Examples of suitable linkages include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor to the driven wheel assembly at the same relative rate of rotation, or it may mechanically augment the rotational input to convey a greater or lesser rate of rotation relative to the rate of rotation of the output of the motor. It is also within the scope of the invention that drive assembly 400 may be formed without a motor output linkage, in which case the motor directly transmits a rotational force to the driven wheels.

Drive assembly 400 also includes at least one or more batteries adapted to provide power to the motor. Any suitable battery may be used, and the batteries may be rechargeable batteries. For example, one or more six-, twelve-, eighteen- or twenty-four-volt batteries may be used. In one specific arrangement, ride-on vehicle 100 includes a single twelve-volt rechargeable battery. On the rear end of the main body 102 is a power switch 402 that is coupled to the battery. The power switch 402 allows the ride-on vehicle 100 to be turned on and off.

Ride-on vehicle 100 further includes one or more control devices that convey inputs from a child sitting on seat assembly 105 to the drive assembly 400. Typically, the control device conveys a user's inputs to the vehicle's wiring harness and affects the actuation of the motor, such as by causing the actuation (or energization) of the motor, selecting between a range of electronic configurations, selecting the direction of rotation of the motor's output, selecting the relative degree of a maximum rate of rotation to which the motor is actuated, etc.

One example of a control device is a speed controller, through which a user input directing the battery assembly to energize the motor is received. In FIG. 2, an example of a speed controller is shown in the form of a foot pedal 404 positioned for actuation by a child sitting on seat assembly 105. Depressing foot pedal 404 causes drive assembly 400 to drive rear wheels 203, 204 and propel the ride-on vehicle 100. Additionally, when foot pedal 404 is no longer depressed, ride-on vehicle 100 has an electronic braking system that automatically stops the vehicle. Other examples of suitable speed controllers include a throttle lever and a rotational handgrip on a steering mechanism that includes a handlebar. When the speed controller takes a form other than a foot pedal, it may be located in any suitable location within or near the riding space 104 so that a child sitting on seat assembly 105 may reach the speed controller.

Figure 6:
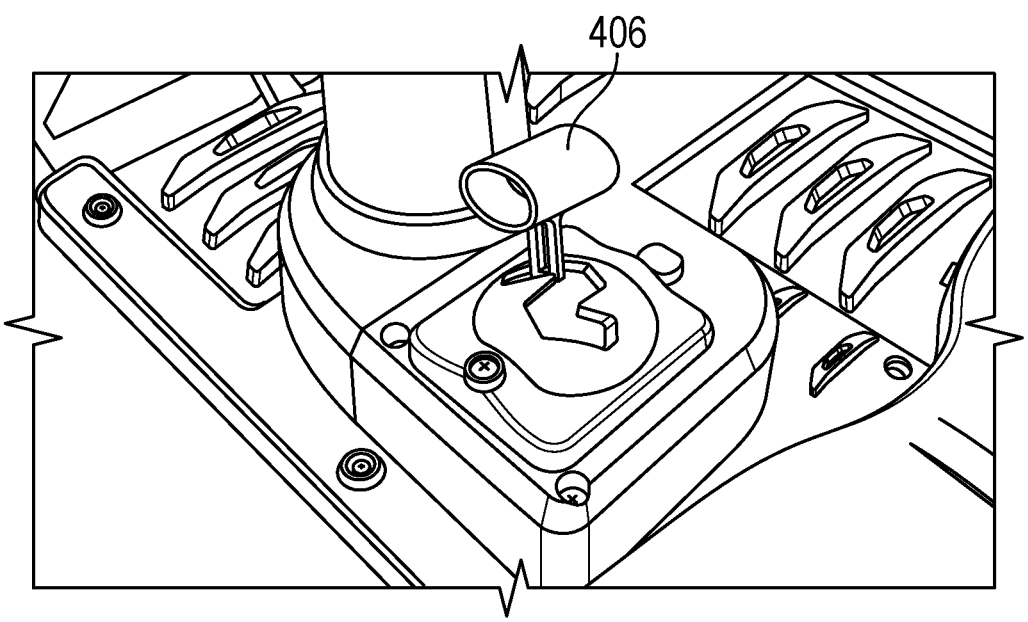
FIG. 6 illustrates a close-up view of a shifter for the ride-on vehicle of FIG. 1, in accordance with an embodiment of the invention.

Another control device that is included in ride-on vehicle 100 is a shifter 406 (see FIG. 6). Shifter 406 enables a child to select the relative rate of rotation of the motor's output, which determines the speed of the ride-on vehicle. Shifter 406 is also used to select the relative direction of rotation of the motor's output (i.e., clockwise or counterclockwise), which determines if the ride-on vehicles moves in a forward or reverse direction. In one exemplary implementation, when shifter 406 is in a first position, the ride-on vehicle operates in a "low" speed configuration (e.g., 2.5 mph or 4 km/h maximum speed) when a child depresses foot pedal 404. When shifter 406 is moved to a second position (as shown in FIG. 6), the ride-on vehicle operates in a "high" speed configuration (e.g., 5 mph or 8 km/h maximum speed) when the child depresses foot pedal 404. Furthermore, moving shifter 406 to a third position causes ride-on vehicle 100 to operate at a "low" speed in reverse. Shifter 406 may be positioned at any suitable location on main body 102 or steering wheel 302 for actuation by a child sitting on seat assembly 105.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. For instance, it should be understood that a children's ride-on vehicle according to the present invention is not limited to the shape provided in the illustrative example and may be shaped as other fantasy-type vehicles or reduced-scale vehicles resembling real world vehicles, such as cars, trucks, construction vehicles, emergency vehicles, off-road vehicles, motorcycles, space vehicles, aircraft, watercraft and the like.

Moreover, it is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" may be used herein to describe an example or illustration. Any embodiment described herein as exemplary is not to be construed as a preferred or advantageous embodiment, but rather as one example or illustration of a possible embodiment of the invention. Finally, various features from one of the embodiments may be incorporated into another of the embodiments.

The invention claimed is:

1. A ride-on vehicle for children comprising:
   a main body that defines a riding space sized to accommodate at least one child, the main body including one or more toy vehicle tracks and an enclosed storage space for receiving toy vehicles, the one or more toy vehicle tracks being configured to direct toy vehicles traveling along the one or more toy vehicle tracks into the enclosed storage space;
   a wheel assembly coupled to the main body, the wheel assembly comprising a plurality of wheels;
   a drive assembly operatively coupled to the wheel assembly, the drive assembly configured to drive two or more wheels of the wheel assembly; and
   a steering assembly operatively coupled to the wheel assembly, the steering assembly configured to steer the ride-on vehicle based on a received user input.

2. The ride-on vehicle of claim 1, wherein the main body is molded to receive at least a portion of the one or more toy vehicle tracks.

3. The ride-on vehicle of claim 1, wherein the one or more toy vehicle tracks include a loop track and at least a portion of the loop track is removable from the main body.

4. The ride-on vehicle of claim 1, wherein a toy vehicle launcher is connected to a first end of a first track of the one or more toy vehicle tracks and the first track is configured such that a toy vehicle launched by the toy vehicle launcher travels along the first track and enters the enclosed storage space via a second end of the first track.

5. The ride-on vehicle of claim 4, wherein the toy vehicle launcher is built into the main body.

6. The ride-on vehicle of claim 4, wherein the main body has a front end and a back end, the enclosed storage space being positioned proximate to the front end and the toy vehicle launcher being positioned proximate to the back end.

7. The ride-on vehicle of claim 1, wherein the main body includes a pivotable front hood that provides access to the enclosed storage space.

8. The ride-on vehicle of claim 1, wherein the one or more toy vehicle tracks comprise two toy vehicle tracks that both direct toy vehicles traveling on the two toy vehicle tracks into the enclosed storage space.

9. The ride-on vehicle of claim 1, wherein a portion of the one or more toy vehicle tracks is positioned along a side of the main body.

10. The ride-on vehicle of claim 1, wherein the one or more toy vehicle tracks are sized to accommodate a 1:64 scale diecast vehicle.

11. A ride-on vehicle for children comprising:
    a main body, the main body including one or more built-in toy vehicle tracks that allow a toy vehicle to travel on the main body, the one or more built-in toy vehicle tracks being configured to direct toy vehicles traveling along the one or more built-in toy vehicle tracks into an enclosed storage space defined by the main body;
    a wheel assembly coupled to the main body, the wheel assembly comprising a plurality of wheels;
    a drive assembly operatively coupled to the wheel assembly, the drive assembly configured to drive two or more wheels of the wheel assembly; and
    a steering assembly operatively coupled to the wheel assembly, the steering assembly configured to steer the ride-on vehicle based on a received user input.

12. The ride-on vehicle of claim 11, wherein the one or more built-in toy vehicle tracks include a loop track.

13. The ride-on vehicle of claim 11, wherein the main body includes a built-in toy vehicle launcher connected to a first track of the one or more built-in toy vehicle tracks.

14. The ride-on vehicle of claim 11, wherein the main body includes a pivotable front hood covering the enclosed storage space.

15. The ride-on vehicle of claim 14, wherein a toy vehicle launcher is connected to a first end of a first track of the one or more built-in toy vehicle tracks and the first track is configured such that a toy vehicle launched by the toy vehicle launcher travels along the first track and enters the enclosed storage space via a second end of the first track.

16. The ride-on vehicle of claim 14, wherein the main body includes two built-in toy vehicle tracks that both direct toy vehicles into the enclosed storage space.

17. The ride-on vehicle of claim 11, wherein the one or more built-in toy vehicle tracks are sized to accommodate a 1:64 scale diecast vehicle.

18. A ride-on vehicle for children comprising:
    a main body that defines a riding space sized to accommodate at least one child;
    a wheel assembly coupled to the main body, the wheel assembly comprising a plurality of wheels;
    a battery-powered drive assembly operatively coupled to the wheel assembly, the drive assembly configured to drive two or more wheels of the wheel assembly;
    a steering assembly operatively coupled to the wheel assembly, the steering assembly configured to steer the ride-on vehicle;
    two toy vehicle tracks configured to allow toy vehicles to travel on the ride-on vehicle, each toy vehicle track having a first end and a second end;
    two toy vehicle launchers, each toy vehicle launcher being connected to the first end of one of the two toy vehicle tracks; and
    an enclosed storage space with a pivotable cover that provides access to the enclosed storage space, the enclosed storage space being connected to the second end of both of the two toy vehicle tracks so that the two toy vehicle tracks are configured to direct toy vehicles traveling along either of the two vehicle tracks into the enclosed storage space.

19. The ride-on vehicle of claim 18, wherein the main body has a front end, a back end, a first side, and a second side, the enclosed storage space being positioned proximate to the front end, the two toy vehicle launchers being positioned proximate to the back end, a portion of one of the two toy vehicle tracks being positioned on the first side, and a portion of an other toy vehicle track of the two toy vehicle tracks being positioned on the second side.

20. The ride-on vehicle of claim 18 further comprising a steering wheel for controlling the steering assembly and a speed controller for controlling the drive assembly, the steering wheel and speed controller both positioned for actuation by a child sitting in the riding space.

\* \* \* \* \*